US006449137B1

(12) United States Patent
Roesner et al.

(10) Patent No.: US 6,449,137 B1
(45) Date of Patent: Sep. 10, 2002

(54) MULTIPLE BREAK CONTACT DEVICE FOR ELECTRICAL SWITCHGEAR

(75) Inventors: Norbert Roesner, St. Augustin; Michael Wohlang, Dattenberg, both of (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/581,728

(22) PCT Filed: Dec. 4, 1998

(86) PCT No.: PCT/DE98/03614

§ 371 (c)(1),
(2), (4) Date: Jun. 16, 2000

(87) PCT Pub. No.: WO99/31690

PCT Pub. Date: Jun. 24, 1999

(30) Foreign Application Priority Data

Dec. 17, 1997 (DE) .................................... 297 22 281 U

(51) Int. Cl.$^{7}$ .................................................. H02H 3/00

(52) U.S. Cl. ......................... 361/115; 361/93.1; 361/78

(58) Field of Search .............................. 361/25, 23, 18, 361/115, 93.1, 78, 42

(56) References Cited

U.S. PATENT DOCUMENTS 4,876,522 A * 10/1989 Mitlmeier et al. .......... 335/193

FOREIGN PATENT DOCUMENTS

| | | | |
|---|---|---|---|
| DE | 663 157 | 7/1938 | |
| DE | 16 77 818 | 5/1954 | |
| DE | 30 33 668 | 3/1981 | |
| DE | 147 587 | 4/1981 | |
| DE | 3 141 958 | 10/1983 | .......... H02H/21/30 |
| FR | 1 406 548 | 11/1965 | |
| GB | 511653 | 8/1939 | |

* cited by examiner

*Primary Examiner*—Stephen W. Jackson
(74) *Attorney, Agent, or Firm*—Kenyon & Kenyon

(57) ABSTRACT

In a multiple break contact device for electrical switchgear the fixed contacts of the switching device are mounted in such a way that they can move linearly along an axis. The multiple break contact device has improved resistance to erosion.

9 Claims, 1 Drawing Sheet

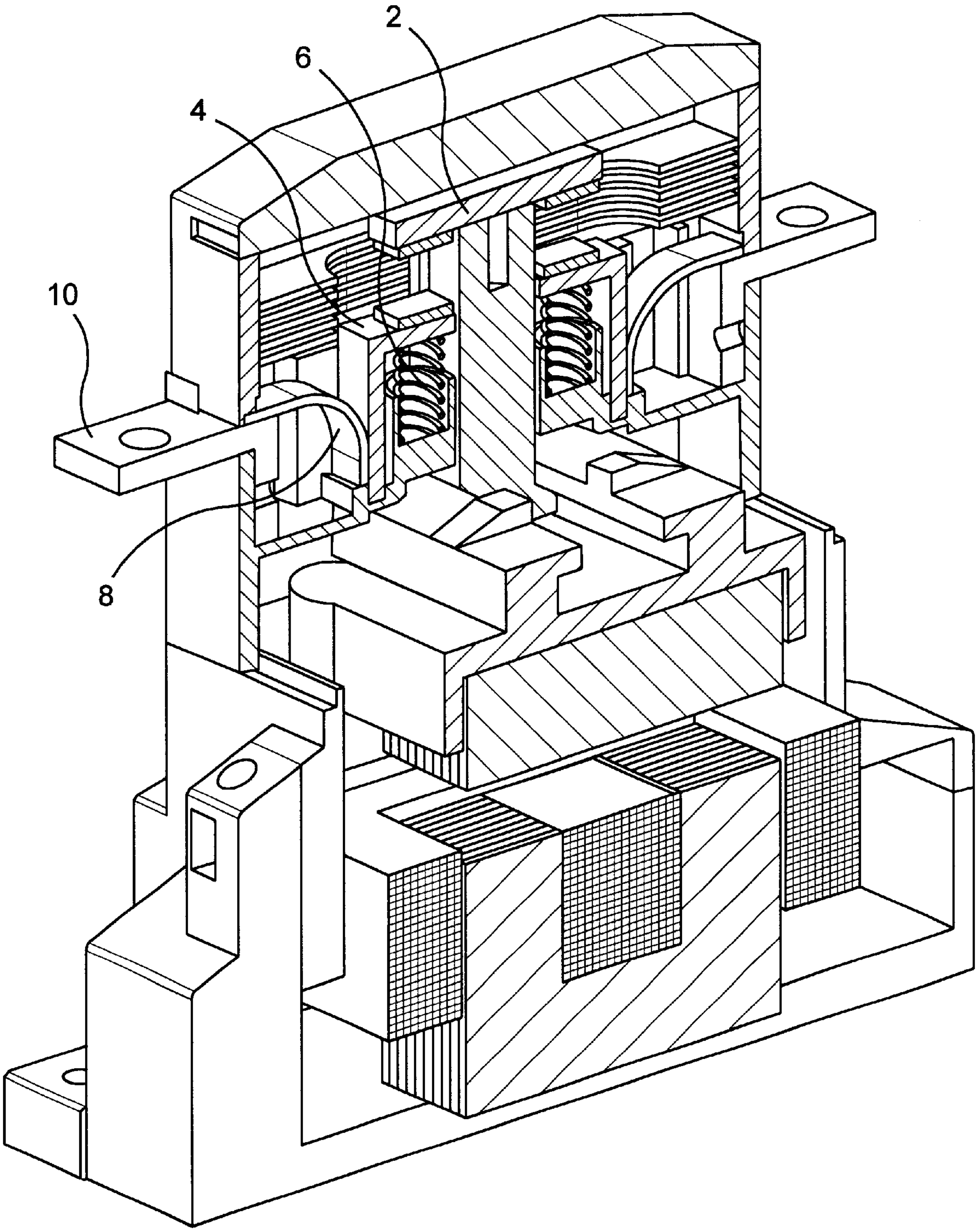
2
6
4
10
8

MULTIPLE BREAK CONTACT DEVICE FOR ELECTRICAL SWITCHGEAR

FIELD OF THE INVENTION

The present invention relates to a contact device for electrical switchgear.

RELATED TECHNOLOGY

A contact device for electrical switchgear is known. Patent No. 147 587 of the former German Democratic Republic describes a double-break contact device for electrical switchgear. The moveable design of the fixed contacts ensures a no longer variable circuit state of this contact device. Here, the fixed contact is a limb-type part that is able to execute a slewing motion and which is pushed in the direction of moveable switching contacts against a limiting stop by a compression spring that is braced against the housing of the switching device.

SUMMARY OF THE INVENTION

An object of the present invention is to provide a contact device for switching gear which, on the one hand, assures more uniform erosion of the contact materials, and on the other hand, because of its design, ensures markedly simpler assembly of the individual parts.

The present invention provides a multiple break contact device for an electrical switchgear, the contact device including at least one contact bridge including at least two movable contact members and being driven by a magnet armature, and at least two linearly moveably supported fixed contacts, the at least two fixed contacts being acted upon by at least one spring element tending to force each of the at least two fixed contacts toward a respective one of the at least two moveable contacts. The straight, linear moving direction of the fixed contacts ensures a uniform contact erosion of the contact materials. In addition, a defined path limitation of the fixed contacts in the actuating direction of the magnet armature of the solenoid-operated mechanism permits the use of a contact erosion indicator.

BRIEF DESCRIPTION OF THE DRAWINGS

FIG. 1 shows a perspective cross-sectional view of a multiple break contact device.

DETAILED DESCRIPTION

FIG. 1 shows a sectional view of a contactor having an embodiment of a contact device according to the present invention.

The contact device shown includes a moveable contact member in the form of a switching bridge 2 and a fixed contact member 4. In this context, contact bridge 2 is, rigidly connected to the driving magnet armature, while, according to the present invention, fixed contacts 4 are supported in the housing interior so as to be linearly moveable along an axis (the axis is formed by the moving direction of the magnet armature). Fixed contacts 4 are may be constructed as angle units, the one angle limb being supported in guide accommodations of the housing so as to be linearly moveable, and the other angle limb being bent away from the first angle limb preferably by 90° and being provided with contact material on its side facing the moveable contact member. A spring element 6 acts with spring tension upon the other side of this angle limb in the direction of moveable contact members 2. For this purpose, a compression spring, for example, is braced in a support of the housing against moveable fixed contact 4. Moveable fixed contacts 4 may be connected to connectors 10 of the switching device via a flexible conductor connection 8 in the form of litz wires. For this purpose, the litz wires are generally welded to fixed contacts 4. Another conceivable embodiment provides for conductor connection 8 to be rigidly designed and conductively connected to fixed contact 4 via a frictional connection, by pressing a contact region of the conductor connection under spring tension onto a contact region of fixed contact 4. In this context, in spite of this frictional force, fixed contact 4 is then moveably supported.

What is claimed is:

1. A multiple break contact device for an electrical switchgear, the contact device comprising:

at least one contact bridge including at least two movable contact members and being driven by a magnet armature; and at least two linearly moveably supported fixed contacts, each fixed contact urged by a corresponding spring element toward a respective one of the at least two moveable contacts.

2. The contact device as recited in claim 1 wherein the electrical switchgear includes contactors.

3. The contact device as recited in claim 1 wherein the at least two moveable contact members exhibit an invariable circuit state when a first contact point of the at least two moveable contacts is welded.

4. The contact device as recited in claim 1 wherein the at least one spring element includes a respective spring element acting on each of the at least two fixed contacts.

5. The contact device as recited in claim 1 wherein each of the at least two fixed contacts includes a respective first and second limb, each respective first limb being guided in an actuation direction of the magnetic armature in a respective guideway disposed in the electrical switchgear, each respective second limb projecting from the respective first limb at a respective angle and including respective contact material.

6. The contact device as recited in claim 1 wherein each of the at least two fixed contacts is connected to a respective connector of the electrical switchgear using a respective flexible conductor member.

7. The contact device as recited in claim 1 wherein each of the at least two fixed contacts is connected to a respective connector of the electrical switchgear using a respective contacting frictional connection and a respective rigid conductor member.

8. The contact device as recited in claim 7 wherein each of the at least two fixed contacts is connected to the respective contacting frictional connection.

9. The contact device as recited in claim 1 wherein the at least two moveable contact members are rigidly connected to the magnet armature.

* * * * *